US012613139B2

(12) United States Patent
Gitzel et al.

(10) Patent No.: US 12,613,139 B2
(45) Date of Patent: Apr. 28, 2026

(54) SYSTEM FOR MONITORING A SWITCHGEAR

(71) Applicant: ABB Schweiz AG, Baden (CH)

(72) Inventors: Ralf Gitzel, Mannheim (DE); Marcel Dix, Allensbach (DE); Holger Kaul, Mannheim (DE); Tomas Kozel, Brno (CZ)

(73) Assignee: ABB Schweiz AG, Baden (CH)

( * ) Notice: Subject to any disclaimer, the term of this patent is extended or adjusted under 35 U.S.C. 154(b) by 377 days.

(21) Appl. No.: 18/175,656

(22) Filed: Feb. 28, 2023

(65) Prior Publication Data

US 2023/0273069 A1      Aug. 31, 2023

(30) Foreign Application Priority Data

Feb. 28, 2022      (EP) ..................................... 22159066

(51) Int. Cl.
*G01J 5/00*          (2022.01)
*G01J 5/48*          (2022.01)
(Continued)

(52) U.S. Cl.
CPC ........... *G01J 5/0096* (2013.01); *G01J 5/0066* (2013.01); *G01J 5/48* (2013.01); *G06T 7/0002* (2013.01);
(Continued)

(58) Field of Classification Search
CPC .......... G01J 5/0096; G01J 5/0066; G01J 5/48; G01J 2005/0077; G01J 5/485;
(Continued)

(56) References Cited

U.S. PATENT DOCUMENTS

2009/0268973 A1 * 10/2009 Majewicz .............. H04N 1/403
                                                                            382/237
2017/0256038 A1 * 9/2017 Lee ...................... G06V 10/764
(Continued)

FOREIGN PATENT DOCUMENTS

CN          107607207 A      1/2018
CN          112288761 A  *  1/2021  ........... G06V 10/757
(Continued)

OTHER PUBLICATIONS

Rokrakthong et al., "Applying CNN to Infrared Thermography for Preventive Maintenance of Electrical Equipment," *Proceedings of the International MultiConference of Engineers and Computer Scientists (IMECS 2019)*, 4 pp. (Mar. 13-15, 2019).
(Continued)

*Primary Examiner* — Edward Park
*Assistant Examiner* — Alexander Joseph Vaughn
(74) *Attorney, Agent, or Firm* — Fitch Even Tabin & Flannery LLP

(57)          ABSTRACT

A system and method for monitoring a switchgear includes an infrared camera, a processing unit, and an output unit. The infrared camera acquires an infrared image of the switchgear, and the processing unit converts it into a binary image. Pixels in the infrared image having a temperature equal to or above a first threshold value are given the same first value. Pixels in the infrared image having a temperature below the first threshold value are given the same second value. The processing unit is configured to implement a Siamese neural network to determine if a hot spot exists in the infrared image.

14 Claims, 4 Drawing Sheets

(51) Int. Cl.

| | |
|---|---|
| *G06T 7/00* | (2017.01) |
| *G06T 7/136* | (2017.01) |
| *G06T 7/174* | (2017.01) |

(52) U.S. Cl.
CPC .............. *G06T 7/136* (2017.01); *G06T 7/174* (2017.01); *G01J 2005/0077* (2013.01); *G06T 2207/10048* (2013.01); *G06T 2207/20081* (2013.01); *G06T 2207/20084* (2013.01)

(58) Field of Classification Search
CPC ....... G06T 7/0002; G06T 7/136; G06T 7/174; G06T 2207/10048; G06T 2207/20081; G06T 2207/20084; G06V 10/143; G06V 10/28; G06V 10/761; G06V 10/774; G06V 10/82; G06V 20/52; G01N 25/72
See application file for complete search history.

(56)                 References Cited

U.S. PATENT DOCUMENTS

| | | | |
|---|---|---|---|
| 2021/0065357 A1 | 3/2021 | Gitzel et al. | |
| 2021/0397837 A1 | 12/2021 | Subbiah et al. | |
| 2022/0057271 A1* | 2/2022 | Gitzel ................... | G01J 5/0066 |

FOREIGN PATENT DOCUMENTS

| | | | | |
|---|---|---|---|---|
| CN | 113436184 A | * | 9/2021 | ............. G06N 3/045 |
| EP | 3706267 A1 | | 9/2020 | |
| EP | 3706268 A1 | * | 9/2020 | .............. H02B 3/00 |
| EP | 3716205 A1 | * | 9/2020 | ............. H04N 23/23 |
| JP | 2006-64389 A | | 3/2006 | |

OTHER PUBLICATIONS

Tuyet-Doan et al., "One-Shot Learning for Partial Discharge Diagnosis Using Ultra-High-Frequency Sensor in Gas-Insulated Switchgear," *Sensors*, 20(19): 13 pp. (Sep. 28, 2020).

European Patent Office, Extended European Search Report in European Patent Application No. 22159066.4, 9 pp. (Sep. 2, 2022).

China National Intellectual Property Administration, Office Action in Chinese Patent Application No. 202310093680.5, 10 pp. (Sep. 1, 2025).

* cited by examiner

Healthy reference image

Siamese neural network

Anomaly detected

Current image

SYSTEM FOR MONITORING A SWITCHGEAR

CROSS-REFERENCE TO RELATED APPLICATIONS

This patent application claims priority to European Patent Application No. 22159066.4, filed on Feb. 28, 2022, which is incorporated herein in its entirety by reference.

FIELD OF THE DISCLOSURE

The present disclosure relates to a system for monitoring a switchgear, a method for monitoring a switchgear, to a switchgear having such a system, and a computer program element.

BACKGROUND OF THE INVENTION

Electrical equipment such as switchgear can suffer from small faults that change the electrical resistance of the system. These faults manifest as hot spots and can ultimately lead to catastrophic failures. Here a switchgear can be a high voltage, medium voltage, or low voltage switchgear.

One solution is to monitor parts of the switchgear, such as the phases, with an infrared thermographic camera to detect the hot spots. This is because infrared (IR) images can be used to identify technical problems within electrical equipment (e.g., switchgear) that lead to the overheating of components and to identify the hot spots themselves.

To avoid malfunctions in electrical equipment, it is necessary to spot malfunctions as early as possible, that result in hot spots which can be detected with the help of IRT cameras, where a human observer is needed who checks the images for hot spots.

However, while a human is quite capable of recognizing hot spots from infrared images, monitoring 24 hours a day every day is required meaning that an automated system is required, to allow continuous, cost-effective monitoring, but and it is not simple for an automated system to determine from infrared imagery whether there is a hot spot.

BRIEF SUMMARY OF THE INVENTION

Therefore, it would be advantageous to have an improved system for monitoring a switchgear. The systems and methods in accordance with the present disclosure are described with respect to a switchgear but find utility in other electrical system than can suffer from components that overheat.

In a first aspect, there is provided a system for monitoring a switchgear. The system comprises:
an infrared camera;
a processing unit; and
an output unit.

The infrared camera is configured to acquire an infrared image of the switchgear. The processing unit is configured to convert the infrared image into a binary image. Pixels in the infrared image having a temperature equal to or above a first threshold value are given the same first value and wherein pixels in the infrared image having a temperature below the first threshold value are given the same second value. Thus, the pixels in the infrared image having a temperature equal to or above the first threshold value are all converted to a first value and the pixels in the infrared image having a temperature below the first threshold value are all converted to a second value. The processing unit is configured to implement a Siamese neural network to determine if a hot spot exists in the infrared image. The determination comprises analysis by the Siamese neural network of the binary image and a reference binary image. The reference binary image was generated from a reference infrared image of the switchgear or of a reference switchgear, and wherein pixels in the reference infrared image having a temperature equal to or above a second threshold value were given the same first value and wherein pixels in the reference infrared image having a temperature below the second threshold value given the same second value to generate the reference binary image. Thus, the reference infrared image can have been acquired from the same switchgear or from an identical or similar switchgear. The output unit is configured to output an indication of a fault in the switchgear on the basis that a hot spot has been determined to exist in the infrared image.

In other words, a machine learning based system uses a Siamese neural network to compare images, where infrared images have been converted to binary images using thresholding, enabling and where one of the images is a reference infrared image of a healthy switchgear and the other infrared image can be a current infrared image used to determine if the switchgear has a hot spot at this current time.

To put this another way, a new data analysis approach has been developed to detect anomalies in IR head images. It makes use of a Siamese neural network to compare black and white threshold images derived from the original infrared images to detect hot spots.

BRIEF DESCRIPTION OF THE SEVERAL VIEWS OF THE DRAWING(S)

DETAILED DESCRIPTION OF THE INVENTION

Figure 1:
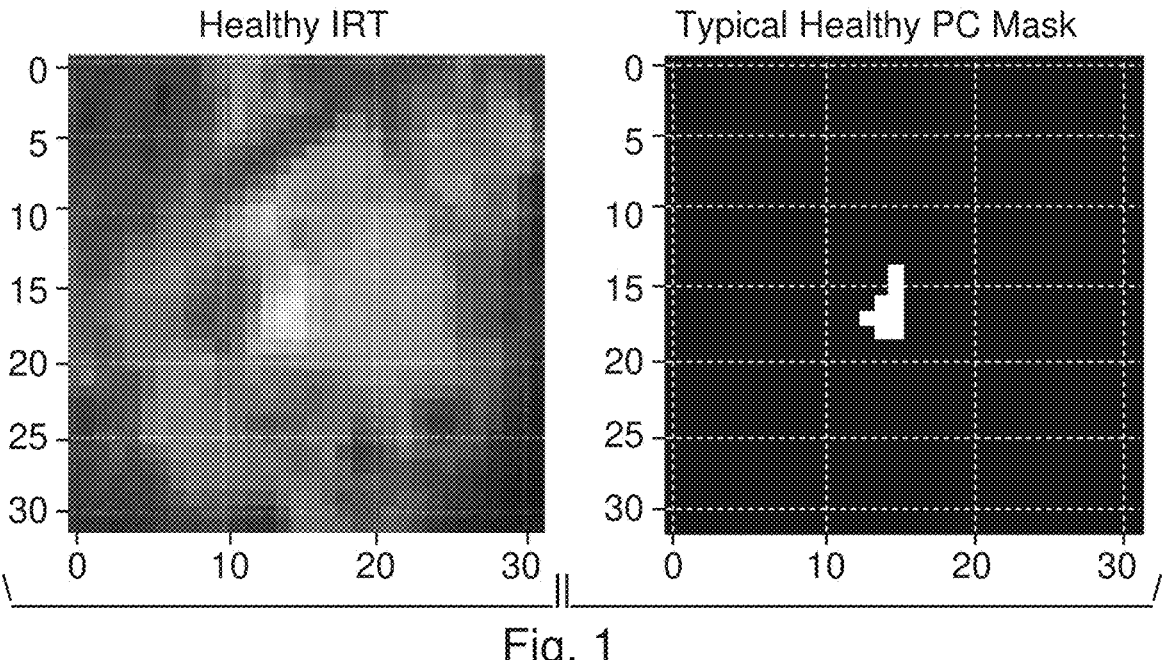
FIG. 1 shows an exemplar healthy infrared image of a switchgear on the left, and a binary mask generated from the healthy infrared image on the right, in accordance with the disclosure.

FIGS. 1-6 provide details explaining a new system for monitoring a switchgear. The system comprises an infrared camera, a processing unit, and an output unit.

The infrared camera is configured to acquire an infrared image of the switchgear. The processing unit is configured to convert the infrared image into a binary image. Pixels in the infrared image having a temperature equal to or above a first threshold value are given the same first value. Pixels in the infrared image having a temperature below the first threshold value are given the same second value. The processing unit is configured to implement a Siamese neural network to determine if a hot spot exists in the infrared image. The determination by the Siamese neural network comprises analysis by the Siamese neural network of the binary image and a reference binary image. The reference binary image was generated from a reference infrared image of the switchgear or of a reference switchgear. Pixels in the reference infrared image having a temperature equal to or above a second threshold value were given the same first value. Pixels in the reference infrared image having a temperature below the second threshold value were given the same second value to generate the reference binary image. The output unit is configured to output an indication of a fault in the switchgear on the basis that a hot spot has been determined to exist in the infrared image.

According to an example, the first threshold value is equal to the second threshold value.

According to an example, the first threshold value is determined as a temperature in the infrared image that is a temperature range below a maximum temperature in the infrared image. The second threshold value is determined as a temperature in the reference infrared image that is a temperature range below a maximum temperature in the reference infrared image.

In an example, the temperature range can be a fixed number of degrees Celsius.

In an example, the temperature range can be a percentage of the current average temperature of the image.

In an example, the temperature range can be a percentage of the maximum temperature of the image.

In an example, the temperature range can be a dynamically changing value in degrees Celsius depending on the average or maximum temperature of the image.

In an example, the temperature range of the threshold is 5 C. In an example, the fixed temperature range of the threshold is 7 C. In an example, the fixed temperature range of the threshold is 10 C. In an example, the fixed temperature range of the threshold is 15 C. In an example, the fixed temperature range of the threshold is 20 C. Thus, for example, when the threshold temperature is 7 C, then for a hottest temperature in the infrared image of 100 C, then all pixels having a temperature of greater than or equal to 93 C are identified and set to the first value and all other pixels are set to the second value.

According to an example, the first threshold value is determined as a temperature in the infrared image that results in several pixels in the infrared image having a temperature between the first threshold temperature in the infrared image and a maximum temperature in the infrared image that most closely matches a number less than a total number of pixels in the infrared image. The second threshold value is determined as a temperature in the reference infrared image that results in several pixels in the reference infrared image having a temperature between the second threshold temperature in the reference infrared image and a maximum temperature in the reference infrared image that most closely matches the number less than the total number of pixels in the infrared image.

According to an example, the first threshold value is determined as an average temperature in the infrared image. The second threshold value is determined as an average temperature in the reference infrared image.

According to an example, the Siamese neural network is a trained Siamese neural network. Training of the Siamese neural network comprised utilization of a plurality of synthetic binary images.

According to an example, the plurality of synthetic binary images were derived from a real infrared image.

Thus, a real infrared image can be used to generate a black and white mask—a binary image. This black and white mask can then be used as a start point to generate a plurality of synthetic black and white masks—plurality of binary images.

According to an example, each of the plurality of synthetic binary images were derived from the real infrared image through random noise being added to a binary image generated from the real infrared image.

According to an example, the plurality of synthetic binary images were derived from an abstract synthetic binary image.

According to an example, each of the plurality of synthetic binary images were derived from the abstract synthetic binary image through random noise being added to the abstract synthetic binary image.

According to an example, the first value is 1 and the second value is 0.

According to an example, the first value is 0 and the second value is 1.

According to an example, the system comprises a visible camera configured to acquire a visible image of the switchgear. The processing unit is configured to overlay a location of a determined hotspot in the infrared image onto a corresponding location in the visible image.

From the above, it is clear that a switchgear could be built having such a monitoring system as described above, or an existing switchgear could be retrofitted with such a system for monitoring a switchgear as described above.

Also, an associated method for monitoring a switchgear comprises:

acquiring with an infrared camera an infrared image of the switchgear;

converting by a processing unit the infrared image into a binary image, wherein pixels in the infrared image having a temperature equal to or above a first threshold value are given the same first value and wherein pixels in the infrared image having a temperature below the first threshold value are given the same second value;

implementing by the processing unit a Siamese neural network and determining if a hot spot exists in the infrared image, wherein the determining comprises analyzing by the Siamese neural network the binary image and a reference binary image, and wherein the reference binary image was generated from a reference infrared image of the switchgear or of a reference switchgear, and wherein pixels in the reference infrared image having a temperature equal to or above a second threshold value were given the same first value and wherein pixels in the reference infrared image having a temperature below the second threshold value were given the same second value to generate the reference binary image; and outputting by an output unit an indication of a fault in the switchgear on the basis that a hot spot has been determined to exist in the infrared image.

In an example, the first threshold value is equal to the second threshold value.

In an example, the first threshold value is determined as a temperature in the infrared image that is a temperature range below a maximum temperature in the infrared image, and the second threshold value is determined as a temperature in the reference infrared image that is a temperature range below a maximum temperature in the reference infrared image.

In an example, the first threshold value is determined as a temperature in the infrared image that results in a number of pixels in the infrared image having a temperature between the first threshold temperature in the infrared image and a maximum temperature in the infrared image that most closely matches a number less than a total number of pixels in the infrared image, and the second threshold value is determined as a temperature in the reference infrared image that results in a number of pixels in the reference infrared image having a temperature between the second threshold temperature in the reference infrared image and a maximum temperature in the reference infrared image that most closely matches the number less than the total number of pixels in the infrared image.

In an example, the first threshold value is determined as an average temperature in the infrared image, and the second threshold value is determined as an average temperature in the reference infrared image.

In an example, the Siamese neural network is a trained Siamese neural network, and training of the Siamese neural network comprised utilization of a plurality of synthetic binary images.

In an example, the plurality of synthetic binary images was derived from a real infrared image.

In an example, each of the plurality of synthetic binary images were derived from the real infrared image through random noise being added to a binary image generated from the real infrared image.

In an example, the plurality of synthetic binary images were derived from an abstract synthetic binary image.

In an example, each of the plurality of synthetic binary images were derived from the abstract synthetic binary image through random noise being added to the abstract synthetic binary image.

In an example, the first value is 1 and the second value is 0.

In an example, the first value is 0 and the second value is 1.

In an example, the method comprises acquiring a visible image of the switchgear with a visible camera and overlaying by the processing unit a location of a determined hotspot in the infrared image onto a corresponding location in the visible image.

Continuing with the figures, the system and method for monitoring a switchgear is described in further detail, with respect to specific embodiments.

In essence, the new technique utilizes machine learning to train an anomaly detection model to be able to identify hot spot images. This allows asset fault detection and condition monitoring. The new technique makes use of a Siamese neural network. Siamese neural networks can be used to compare two images and state whether they are the same or different. It was realized that such a Siamese neural network could be used to analyze infrared images to identify hot spots. It was however determined that the Siamese neural network could be made to operate more successfully, and be better trained, when the infrared imagery was converted into black and white images based on thresholding. Also, a technique to generate a population of training imagery was developed to obtain a well-trained model that can understand which subtle differences are acceptable or okay, and also which differences are anomalous.

Therefore, instead of comparing a healthy image to the current image to determine anomalies, black and white masks are computed based on a threshold or threshold values. The resulting black and white images (see FIG. 1 and FIG. 2) are used as input for the Siamese neural network. The white pixels in FIG. 1 and FIG. 2 have temperatures that are equal to or above a threshold value and have all been set to a value of 1, whilst the black pixels have temperatures below the threshold and have been all set to a value of 0. Each image can have a different threshold value, or both can have the same value. If the current image looks the same as the reference image, the equipment is healthy. Otherwise, it is faulty. The Siamese neural network is trained to carry out this comparison and provide the healthy/faulty determination.

Figure 2:
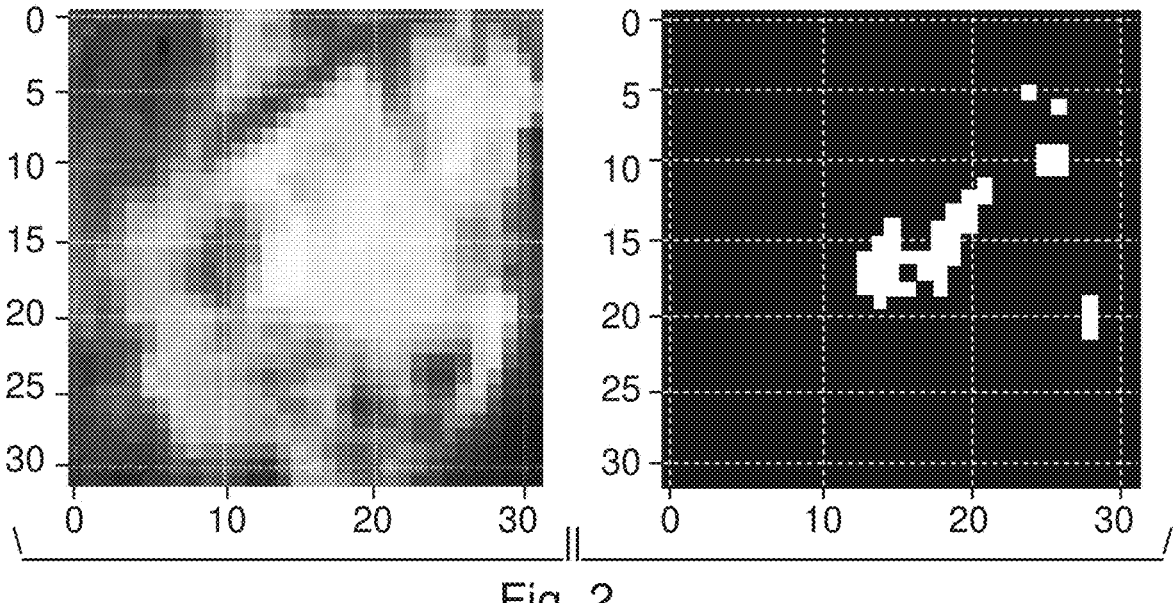
FIG. 2 shows an exemplar faulty infrared image of a switchgear on the left and a binary mask generated from the faulty infrared image on the right, in accordance with the disclosure.

The advantage of using the masks is twofold. First, even for a human, the images are easier to distinguish. The faulty mask in FIG. 2 is larger and more spread out than the healthy mask in FIG. 1. Here mask refers to the white pixels that are above a threshold value. The actual infrared images themselves are harder to tell apart. Second, it is easier to provide synthetic training data for a neural network that can distinguish abstract white shapes on a black background in comparison to one that works on images without clear shapes.

It turns out that using these threshold images can lead to a better trained model, in comparison to the machine learning model trained with the original heat images. Thus, in developing the new technique the following new developments were made:

A new technique to derive black and white threshold images from the original IR images.

The new concept of using these threshold images as input to the anomaly detection model (in this case: a Siamese neural network model).

Figure 3:
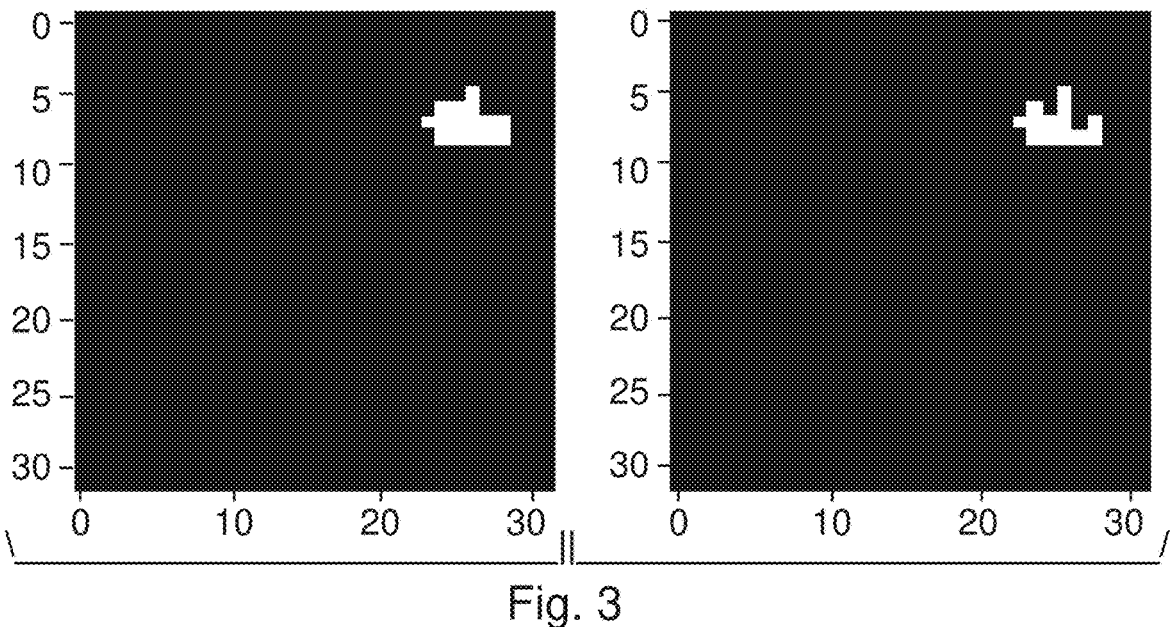
FIG. 3 shows an example of binary mask training data in accordance with the disclosure.
Figure 4:
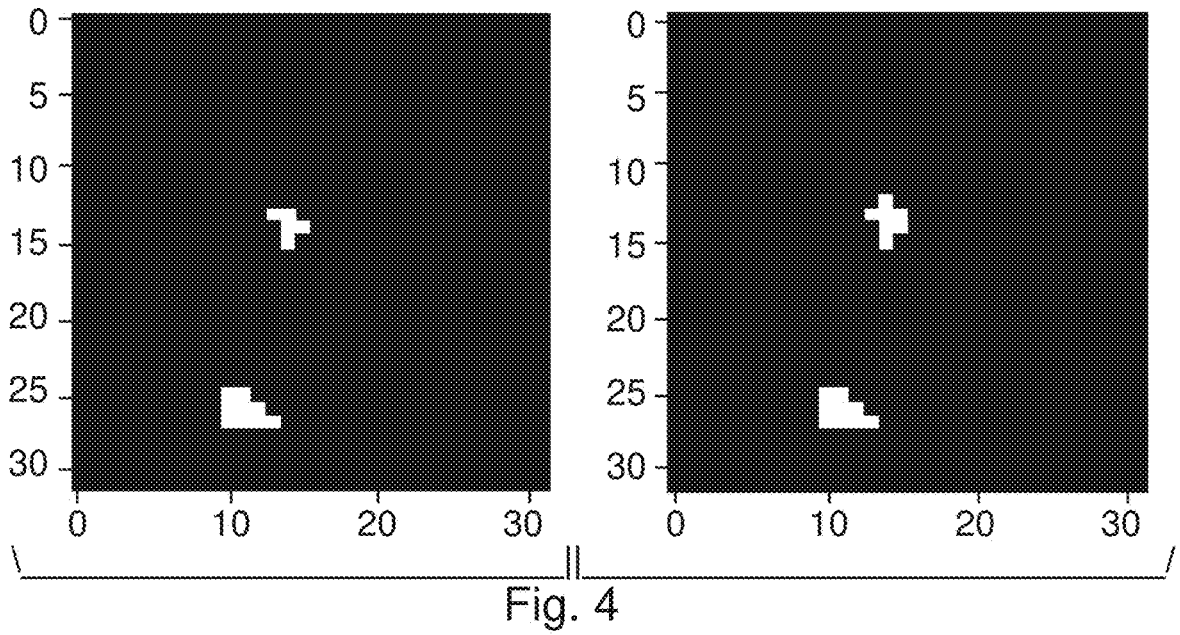
FIG. 4 shows an example of binary mask training data in accordance with the disclosure.

The core of the new technique is a Siamese neural network that is trained to distinguish black and white images of abstract shapes such as the ones shown in FIG. 3 and FIG. 4. In the example, the two images are the same except for a few noise pixels. Given the abstract nature of the shapes, synthetic training data can be generated by randomly generating one or more shapes in a bitmap and adding noise pixels (black and/or white) for the second bitmap. This is an example of an identical pair to use for training. A real infrared image can also be used, from which a black and white mask is generated, and this can then have random noise added to it.

Figure 5:
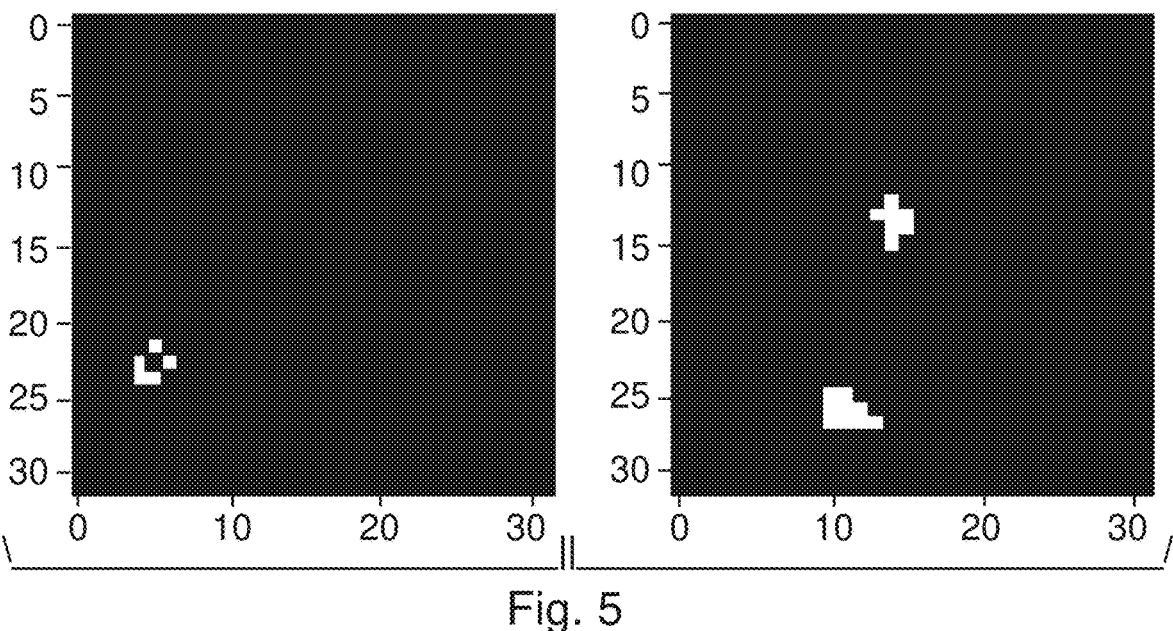
FIG. 5 shows an example of binary mask non-identical training data in accordance with the disclosure.

If the second bitmap (binary image or mask) is not based on the first bitmap but contains another set of random shapes, it is an example of a non-identical pair (See FIG. 5). This then enables the Siamese neural network not only to be trained on similar pairs of binary images, enabling it to determine healthy situations, but also to be trained on dissimilar pairs of binary images enabling it to determine faulty situations. Real healthy and faulty infrared imagery, when available, can also be converted to binary images and used for training of the Siamese neural network, but synthetic generation as discussed here enables significant training datasets to be provided.

It is then efficient to generate enough training pairs with for example a software script. The trained model is then able to distinguish black and white images that show basic shapes.

Figure 6:
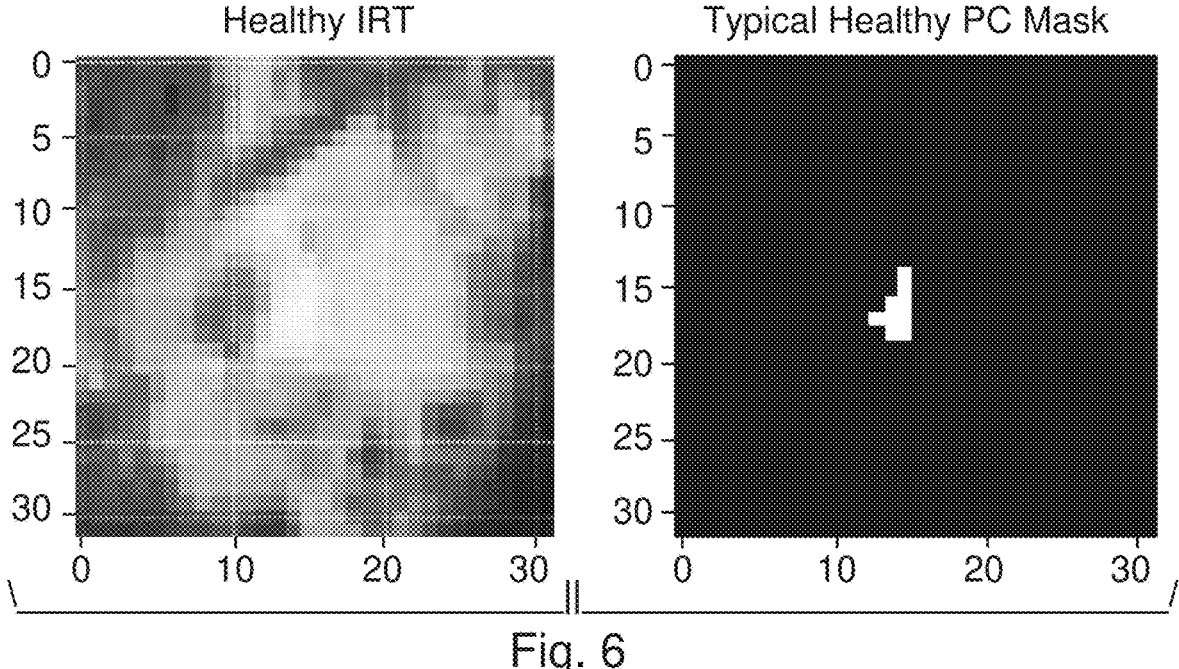
FIG. 6 shows an exemplar healthy infrared image of a switchgear and a binary mask generated from the healthy infrared image in accordance with the disclosure.

The term thresholding has been referred to above. This is explained as follows. Infrared images are basically matrices of temperature values. If a threshold value less than the maximum temperature is applied, the image can be divided into two regions. One contains all pixels above the threshold (often depicted as white) and the other contains those equal to or below the threshold (black). The two regions can also be when all pixels equal to and above the threshold are white and those below the threshold are black. FIG. 6 shows an example of this procedure.

The threshold can be static or dynamic. It can be x° C. below the maximum temperature or some other value computed from the temperature values in the image, e.g., average but also more complex formulas that consider a set size of a hot region that then changes shape as a hot spot develops.

Figure 7:
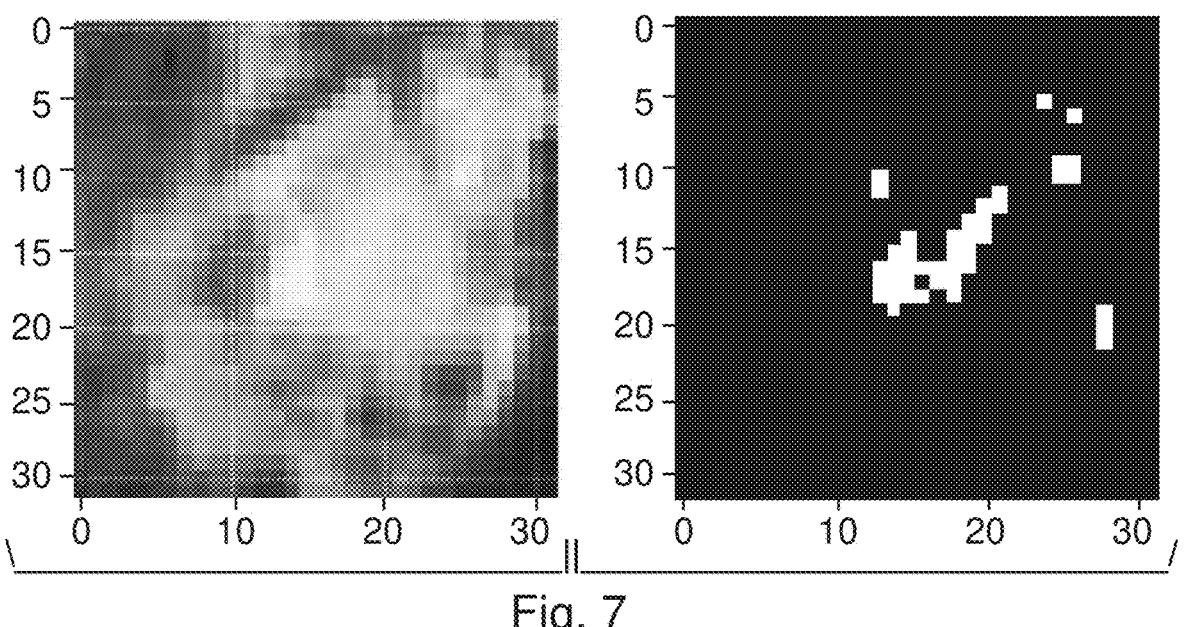
FIG. 7 shows an exemplar faulty infrared image of a switchgear on the left and a binary mask generated from the faulty infrared image on the right, in accordance with the disclosure.

The resulting images do not change much when applied to a healthy system, i.e. most images will look quite similar to FIG. 6 for the example system used here. However, hot spots will result in quite a bit of deviation over time (for example as shown in FIG. 7).

Figure 8:
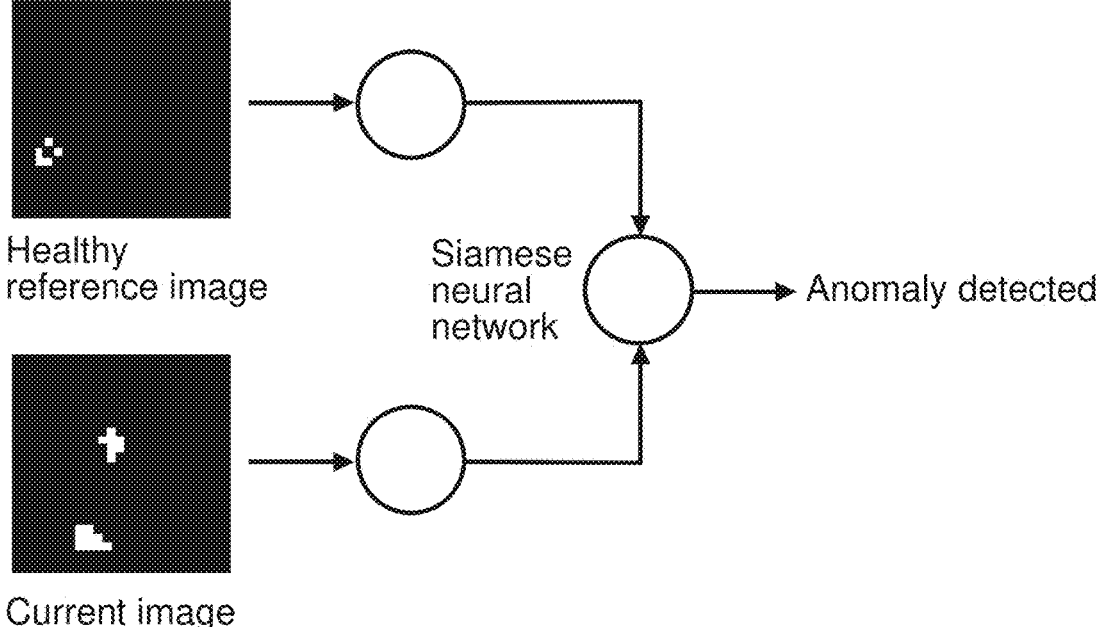
FIG. 8 shows a schematic diagram of the processing carried out in a system for monitoring a switchgear in accordance with the disclosure.

Regarding classification, the working principle of anomaly detection is shown in FIG. 8. A reference image is created for the system that shows the healthy state. The current image is distilled from the infrared thermal image and put into the Siamese neural network together with the reference image. If the two images look similar, the system classifies them as "normal". If the two images look different, the system classification is "anomaly."

In another exemplary embodiment, a computer program or computer program element is provided that is characterized by being configured to execute the method steps of the method according to one of the preceding embodiments, on an appropriate processor or system.

The computer program element might therefore be stored on a computer unit, which might also be part of an embodiment. This computing unit may be configured to perform or induce performing of the steps of the method described above. Moreover, it may be configured to operate the components of the above-described system. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, USB stick or the like, is presented wherein the computer readable medium has a computer program element stored on it which computer program element is described by the preceding section.

A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

In an example, the first threshold value is equal to the second threshold value.

In an example, the first threshold value is determined as a temperature in the infrared image that is a temperature range below a maximum temperature in the infrared image, and the second threshold value is determined as a temperature in the reference infrared image that is a temperature range below a maximum temperature in the reference infrared image.

In an example, the first threshold value is determined as a temperature in the infrared image that results in a number of pixels in the infrared image having a temperature between the first threshold temperature in the infrared image and a maximum temperature in the infrared image that most closely matches a number less than a total number of pixels in the infrared image. The second threshold value is determined as a temperature in the reference infrared image that results in a number of pixels in the reference infrared image having a temperature between the second threshold temperature in the reference infrared image and a maximum temperature in the reference infrared image that most closely matches the number less than the total number of pixels in the infrared image.

In other words, infrared imagery of a switchgear is acquired, for example of the three phases. An infrared image could have 1024 pixels. A number such as 300 is selected. Then an image is analyzed to determine the maximum or hottest temperature in an image. For example, this could be 60.5 C. Then for a temperature threshold of 59 C there will be a number A of pixels between 59 C and 60.5 C, and for a temperature threshold of 58 C there will be a number B of pixels (where B is greater than A) between 58 C and 60.5 C. The processing unit therefore determines a temperature threshold, say 51.5 C, that results in a number of pixels (say 302) between 51.5 C and 60.5 C that is as close to the selected number (300) as possible. For example, a temperature threshold of 52 C may have resulted in a number of pixels equal to 295, and thus a threshold temperature of 51.5 C was the determined temperature threshold. This threshold is then used to generate the binary image. A similar process is used to generate the reference binary image. These two images are then compared with a Siamese neural network and if they are "equivalent" then there is no hotspot, but if they are different the Siamese neural network will detect this and determine that there is a hotspot in the infrared image.

In an example, the first threshold value is determined as an average temperature in the infrared image; and wherein the second threshold value is determined as an average temperature in the reference infrared image.

In an example, the Siamese neural network is a trained Siamese neural network, and wherein training of the Siamese neural network comprised utilization of a plurality of synthetic infrared images.

In an example, the plurality of synthetic infrared images was derived from a real infrared image.

In an example, each of the plurality of synthetic infrared images were derived from the real infrared image through random noise being added to the real infrared image.

In an example, the plurality of synthetic infrared images was derived from an abstract synthetic infrared image.

In an example, each of the plurality of synthetic infrared images were derived from the abstract synthetic infrared image through random noise being added to the abstract synthetic infrared image.

Thus, an efficient mechanism is provided to train the Siamese neural network, where pairs of images that are almost identical can be used to train the Siamese neural network to recognize that two images are in effect the same, enabling the network to recognize that a real IR image of a "healthy situation" when compared to a real reference IR image that is also of a healthy situation are in effect the same, and that there is no hot spot. Conversely, image data of one or more actual hot spot situations from real data and also synthetically generated can be used as a source to generate multiple such "faulty" images, and these images when input with healthy images into the Siamese neural network enables the Siamese neural network to be trained to recognize that the images are not the same. Thus, the network is trained recognize that a real IR image of an "unhealthy situation" when compared to a real reference IR image that is of a healthy situation are different, and that there is a hot spot associated with the real IR image.

In an example, the first value is 1 and the second value is 0, or the first value is 0 and the second value is 1.

In an example, the system comprises a visible camera configured to acquire a visible image of the switchgear, and the processing unit is configured to overlay a location of a determined hotspot in the infrared image onto a corresponding location in the visible image.

In a second aspect, there is provided a switchgear comprising a system according to the first aspect.

In a third aspect, there is provided a method for monitoring a switchgear, the system comprising:

acquiring with an infrared camera an infrared image of the switchgear;

converting by a processing unit the infrared image into a binary image, wherein pixels in the infrared image having a temperature equal to or above a first threshold value are given the same first value and wherein pixels in the infrared image having a temperature below the first threshold value are given the same second value;

implementing by the processing unit a Siamese neural network and determining if a hot spot exists in the infrared image, wherein the determining comprises analysing the Siamese neural network the binary image and a reference binary image, and wherein the reference binary image was generated from a reference infrared image of the switchgear or of a reference switchgear, and wherein pixels in the reference infrared image having a temperature equal to or above a second threshold value were given the same first value and wherein pixels in the reference infrared image having a temperature below the second threshold value were given the same second value to generate the reference binary image; and outputting by an output unit an indication of a fault in the switchgear on the basis that a hot spot has been determined to exist in the infrared image.

According to another aspect, there is provided a computer program element controlling one or more of the systems as previously described which, if the computer program element is executed by a processor, is adapted to perform the method as previously described.

According to another aspect, there is provided a computer readable medium having stored a computer element as previously described.

The computer program element can for example be a software program but can also be a FPGA, a PLD or any other appropriate digital means.

The above aspects and examples will become apparent from and be elucidated with reference to the embodiments described hereinafter.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for monitoring a switchgear, the system comprising:

an infrared camera;

a processing unit; and an output unit;

wherein, the infrared camera is configured to acquire an infrared image of the switchgear;

wherein the processing unit is configured to convert the infrared image into a binary image, wherein pixels in the infrared image having a temperature equal to or above a first threshold value are given the same first value and wherein pixels in the infrared image having a temperature below the first threshold value are given the same second value;

wherein the processing unit is configured to implement a Siamese neural network to determine if a hot spot exists in the infrared image, wherein the determination comprises analysis by the Siamese neural network of the binary image and a reference binary image, and wherein the reference binary image was generated from a reference infrared image of the switchgear or of a reference switchgear, and wherein pixels in the reference infrared image having a temperature equal to or above a second threshold value were given the same first value and wherein pixels in the reference infrared image having a temperature below the second threshold value were given the same second value to generate the reference binary image;

wherein the output unit is configured to output an indication of a fault in the switchgear on the basis that a hot spot has been determined to exist in the infrared image; and wherein the Siamese neural network is a trained Siamese neural network, wherein training of the Siamese neural network comprises utilization of a plurality of synthetic binary images, wherein the plurality of synthetic binary images are derived from a real infrared image through random noise being added to a binary image generated from the real infrared image, and wherein the binary image is a black and white mask.

2. The system according to claim 1, wherein the first threshold value is equal to the second threshold value.

3. The system according to claim 1, wherein the first threshold value is determined as a temperature in the infrared image that is a temperature range below a maximum temperature in the infrared image; and wherein the second threshold value is determined as a temperature in the reference infrared image that is a temperature range below a maximum temperature in the reference infrared image.

4. The system according to claim 1, wherein the first threshold value is determined as a temperature in the infrared image that results in a number of pixels in the infrared image having a temperature between the first threshold temperature in the infrared image and a maximum temperature in the infrared image that most closely matches a number less than a total number of pixels in the infrared image; and wherein the second threshold value is determined as a temperature in the reference infrared image that results in a number of pixels in the reference infrared image having a temperature between the second threshold temperature in the reference infrared image and a maximum temperature in the reference infrared image that most closely matches the number less than the total number of pixels in the infrared image.

5. The system according to claim 1, wherein the first threshold value is determined as an average temperature in the infrared image; and wherein the second threshold value is determined as an average temperature in the reference infrared image.

6. The system according to claim 1, wherein the plurality of synthetic binary images are derived from an abstract synthetic binary image.

7. The system according to claim 6, wherein each of the plurality of synthetic binary images were derived from the abstract synthetic binary image through the random noise being added to the abstract synthetic binary image.

8. The system according to claim 1, wherein one of the first value and the second value is 1 and other is 0.

9. The system according to claim 1, wherein the system comprises a visible camera configured to acquire a visible image of the switchgear, and wherein the processing unit is configured to overlay a location of a determined hotspot in the infrared image onto a corresponding location in the visible image.

10. A method for monitoring a switchgear, the method comprising:

acquiring with an infrared camera an infrared image of the switchgear;

converting by a processing unit the infrared image into a binary image, wherein pixels in the infrared image having a temperature equal to or above a first threshold value are given the same first value and wherein pixels in the infrared image having a temperature below the first threshold value are given the same second value;

implementing by the processing unit a Siamese neural network and determining if a hot spot exists in the infrared image, wherein the determining comprises analyzing by the Siamese neural network the binary image and a reference binary image, and wherein the reference binary image was generated from a reference infrared image of the switchgear or of a reference switchgear, and wherein pixels in the reference infrared image having a temperature equal to or above a second threshold value were given the same first value and wherein pixels in the reference infrared image having a temperature below the second threshold value were given the same second value to generate the reference binary image; and outputting by an output unit an indication of a fault in the switchgear on the basis that a hot spot has been determined to exist in the infrared image, wherein the Siamese neural network is a trained Siamese neural network, wherein training of the Siamese neural network comprises utilization of a plurality of synthetic binary images, wherein the plurality of synthetic binary images are derived from a real infrared image through random noise being added to a binary image generated from the real infrared image, and wherein the binary image is a black and white mask.

11. The method according to claim 10, wherein the first threshold value is equal to the second threshold value.

12. The method according to claim 10, wherein the first threshold value is determined as a temperature in the infrared image that is a temperature range below a maximum temperature in the infrared image; and wherein the second threshold value is determined as a temperature in the reference infrared image that is a temperature range below a maximum temperature in the reference infrared image.

13. The method according to claim 10, wherein the first threshold value is determined as a temperature in the infrared image that results in a number of pixels in the infrared image having a temperature between the first threshold temperature in the infrared image and a maximum temperature in the infrared image that most closely matches a number less than a total number of pixels in the infrared image; and wherein the second threshold value is determined as a temperature in the reference infrared image that results in a number of pixels in the reference infrared image having a temperature between the second threshold temperature in the reference infrared image and a maximum temperature in the reference infrared image that most closely matches the number less than the total number of pixels in the infrared image.

14. The method according to claim 10, wherein the first threshold value is determined as an average temperature in the infrared image; and wherein the second threshold value is determined as an average temperature in the reference infrared image.

\* \* \* \* \*